(12) United States Patent
Gregoire (10) Patent No.: US 9,273,794 B2
(45) Date of Patent: Mar. 1, 2016

(54) PNEUMATIC VALVE ACTUATOR HAVING INTEGRAL STATUS INDICATION

(76) Inventor: Roger Gregoire, New Braunfels, TX (US)

( * ) Notice: Subject to any disclaimer, the term of this patent is extended or adjusted under 35 U.S.C. 154(b) by 1118 days.

(21) Appl. No.: 12/345,264

(22) Filed: Dec. 29, 2008

(65) Prior Publication Data

US 2010/0163765 A1 Jul. 1, 2010

(51) Int. Cl.
*F16K 31/122* (2006.01)
*F16K 37/00* (2006.01)

(52) U.S. Cl.
CPC ......... *F16K 31/1221* (2013.01); *F16K 31/1226* (2013.01); *F16K 37/0008* (2013.01)

(58) Field of Classification Search
CPC ............ F16K 37/0008; F16K 31/1226; F16K 31/1221
USPC ............ 137/553, 556; 251/62, 63.4, 63.5, 82; 92/5 R
See application file for complete search history.

(56) References Cited

U.S. PATENT DOCUMENTS

| | | | | | |
|---|---|---|---|---|---|
| 4,432,385 | A | * | 2/1984 | Legris | 137/556 |
| 4,450,861 | A | * | 5/1984 | Bouteille | 137/553 |
| 4,819,691 | A | * | 4/1989 | Lofgren et al. | 137/556 |
| 6,138,712 | A | * | 10/2000 | Hirose | 137/556 |
| 6,805,158 | B2 | * | 10/2004 | Ejiri | 137/557 |
| 7,168,676 | B2 | * | 1/2007 | Kajitani | 251/63.6 |

* cited by examiner

*Primary Examiner* — Arthur O Hall
*Assistant Examiner* — Chee-Chong Lee
(74) *Attorney, Agent, or Firm* — Novak Druce Connolly Bove + Quigg LLP

(57) ABSTRACT

A pneumatic valve actuator having integral status indication includes an actuator housing with a recessed bore and a visual indicator coupled to a piston within a cylinder. An actuating pressure chamber is located also within the cylinder. The piston reciprocates in the cylinder in response to fluid pressure build-up in the actuating pressure chamber, and the visual indicator reciprocates within the bore. The visual indicator coupled to the piston can be in a retracted configuration when actuating pressure is not present in the pressure chamber and can be in an extended configuration when actuating pressure is presented in the pressure chamber. The visual indicator, which can have a portion that extends outside the bore colored to provide an indication of the operating state of the valve.

17 Claims, 8 Drawing Sheets

Non-actuated Condition

Actuated Condition

Non-actuated Condition
(Valve Open)

Actuated Condition
(Valve Closed)

PNEUMATIC VALVE ACTUATOR HAVING INTEGRAL STATUS INDICATION

FIELD OF TECHNOLOGY

The present disclosure relates generally to pneumatic actuators. More specifically, the present disclosure relates to status indicators for pneumatic valve actuators.

BACKGROUND

Pneumatically operated valves are commonly used in gas delivery systems where automatic or remote control of valve operation is necessary, and where electrical solenoid valves are not practical. Pneumatic valves are very common within the gas delivery systems used in the semiconductor industry, because of the hazardous nature of the many process gases used to fabricate microchips.

Prior pneumatic actuators with status indicators have been pressure actuated devices. These pressure actuated devices however have been prone to give false indications because they only respond to a given or set pressure, regardless of whether the valve has actually opened or not. Typical pneumatically actuated valves have variable pneumatic pressure requirements that are dependent on changing conditions, such as internal system pressure, load spring compression, piston area, o-ring stiction, ambient temperatures, or the like. Because such pneumatic actuators with status indicators are known to be unreliable, gas handling system designers and users do not rely on them as a true indication of the valve's open-closed position.

Figure 4:
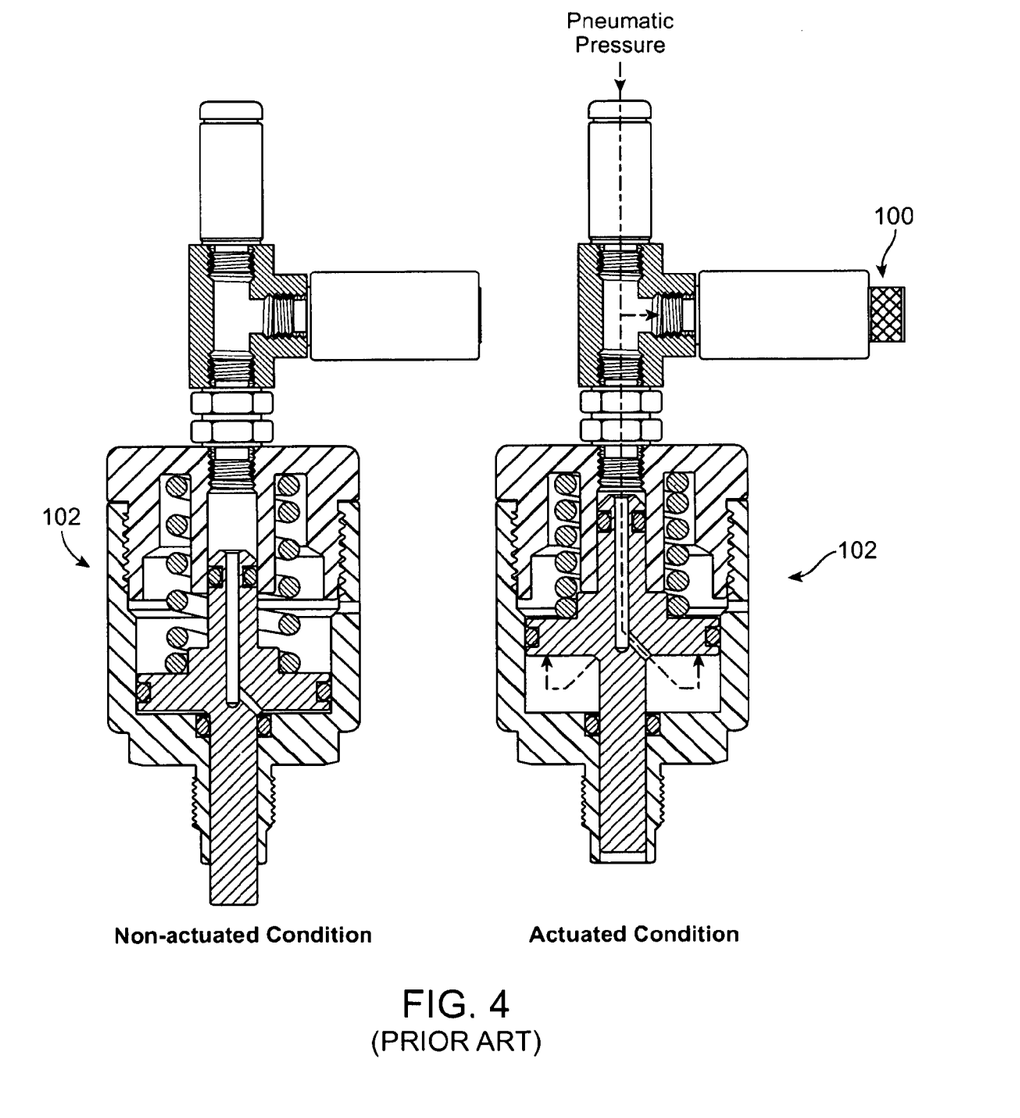
FIG. 4 depicts a prior art pneumatic valve actuator and indicator assembly in both a non-actuated condition and an actuated condition.

Even more, these indicators are cumbersome devices because they consist of an assembly of separate components, such as the one illustrated in FIG. 4. Actuator and status indicator assemblies 102 can include the pneumatic indicator 100, the pneumatic actuator, and a multitude of necessary fittings to connect the actuator to the-indicator and pneumatic supply fitting. These assemblies increase the overall size of valve actuators because they extend outward, which makes them prone to accidental breakage and damage. Furthermore, the additional connector at the visual status indicator 100 is not directly linked to the piston actuating the valve. Since the indicator is not directly linked to the valve, it is unlikely that the indicator would give a true indication of the open-closed position of the valve. For example, pneumatic pressure could be applied as shown in the actuated condition, but the piston of the actuator could be immobile whereby the valve remains unactuated.

Figure 5:
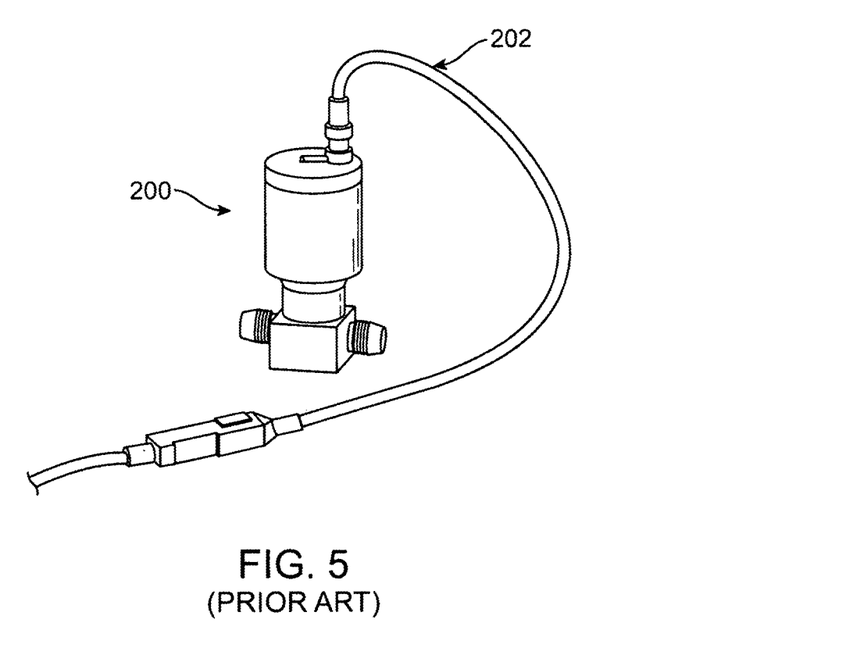
FIG. 5 depicts another prior art valve actuator having an electrical switch to indicate valve position.
Figure 6:
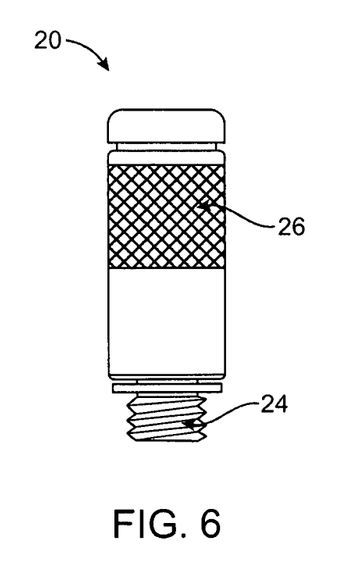
FIG. 6 is a front perspective view of the visual indicator for a pneumatic valve actuator.

Advancements have been made in the area of pneumatic valve actuators with status indicators and have included adding electrical switches 202 to indicate the open-closed status of the valve, an example of which is shown in FIG. 5. However, these actuators 202 are costly and cannot be implemented in certain industries. For example, electrical switches 202 would not be effective in the semiconductor industry because of the potential spark and explosion hazards of the electrical components of such a valve actuator 200 having electrical switches 202. In these actuators 200, the electric switches 202 are mechanically attached to a moving part or mechanism of the valve actuator, and the wiring is connected to external circuitry so as to give movement indication of the valve's position. Although these actuators 200 can indicate the open-closed status of a valve, they are limited in their application because of their potential explosion hazards.

Therefore, there is a need for a simpler, more reliable, more versatile, and cost-effective pneumatic valve actuator with status indication that indicates both whether pressure is present in the actuator and what the current position of the associate valve is.

BRIEF DESCRIPTION OF THE DRAWINGS

Embodiments of the present disclosure will now be described, by way of example only, with reference to the attached Figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Figure 1:
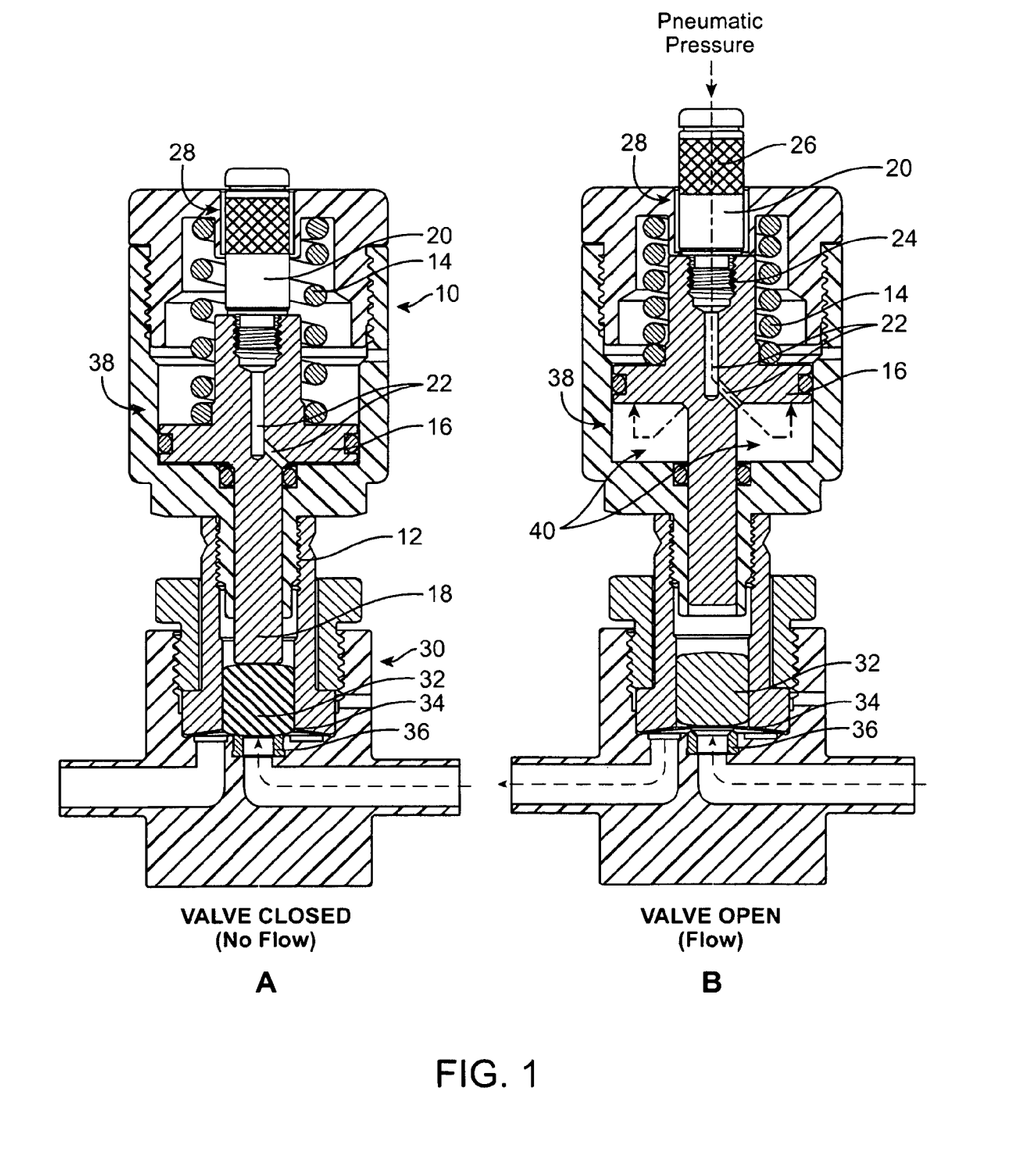
FIG. 1A is a cross-sectional view of an exemplary embodiment of a normally-closed pneumatic valve actuator having integral status indication that is attached to a valve assembly when the valve is closed.
FIG. 1B is a cross-sectional view of an exemplary embodiment of a normally-closed pneumatic valve actuator having integral status indication that is attached to a valve assembly when the valve is open.

An exemplary normally-closed pneumatic valve actuator 10 having integral status indication is shown in FIG. 1. As shown, the pneumatic valve actuator 10 is attached to a valve assembly for controlling fluid flow. The valve is a diaphragm type valve that is normally open so that an actuator 10 must close it to prevent fluid flow. It will be appreciated however that the actuator 10 could be used with other valve configurations. FIG. 1A illustrates the pneumatic valve actuator 10 in its normal unactuated condition when the valve is held in a closed position. The diaphragm valve is held in a closed position by a load spring 14 that presses against a piston 16 above the valve. As the spring 14 presses down on the piston 16, the piston stem 18 is pressed against a valve button 32. The valve button 32 then deflects a diaphragm 34 onto the valve seat 36 of the valve, thereby preventing fluid flow through the valve ports. Additionally, as the load spring 14 presses down on the piston 16, it pulls the visual indicator 20 down into a retracted configuration inside the recessed bore 28 of the actuator 10. This retracted configuration indicates that the valve is closed and that there is no pressure in the actuating pressure chamber 40 of the actuator 10. While the actuator 10 as described above holds the valve in a closed position, the valve may be in an open position as will be described later. Furthermore, in some embodiments, the valve is controlled by the motion of the actuator 10 such that the actuator 10 causes the valve to open or close rather than having a predetermined bias. The remaining disclosure focuses on these diaphragm-type valves but other types of valves are considered within the scope of this disclosure.

FIG. 1B shows the same normally-closed pneumatic valve actuator 10 but in an actuated condition when pneumatic pressure is applied. Here, fluid is supplied through the visual indicator 20, which is coupled to the piston 16. The fluid is diverted through ports 22 fluidly connecting the piston 16 and visual indicator 20 with the actuating pressure chamber 40. As fluid flows through the ports 22 into the actuating pressure chamber 40, a pressure is applied beneath the piston 16 causing the piston 16 to move upwards. This then compresses the load spring 14 lifting the piston stem 18 off of the valve button 32. This allows the diaphragm 34 to deflect to its normal position, thereby opening the valve and allowing fluid to flow through the valve ports. Also, as the piston 16 moves upward, the visual indicator 20 is moved into an extended configuration where an indicator band 26 on the visual indicator 20 is exposed outside the actuator housing to indicate an actuated status, which in this case is a "valve open" status. Because the visual indicator 20 is directly and mechanically linked to the piston 16, the visual indicator 20 provides a more reliable and true indication of the position of the valve, as it will only expose the indicator band 26 in an actuated state.

Figure 2:
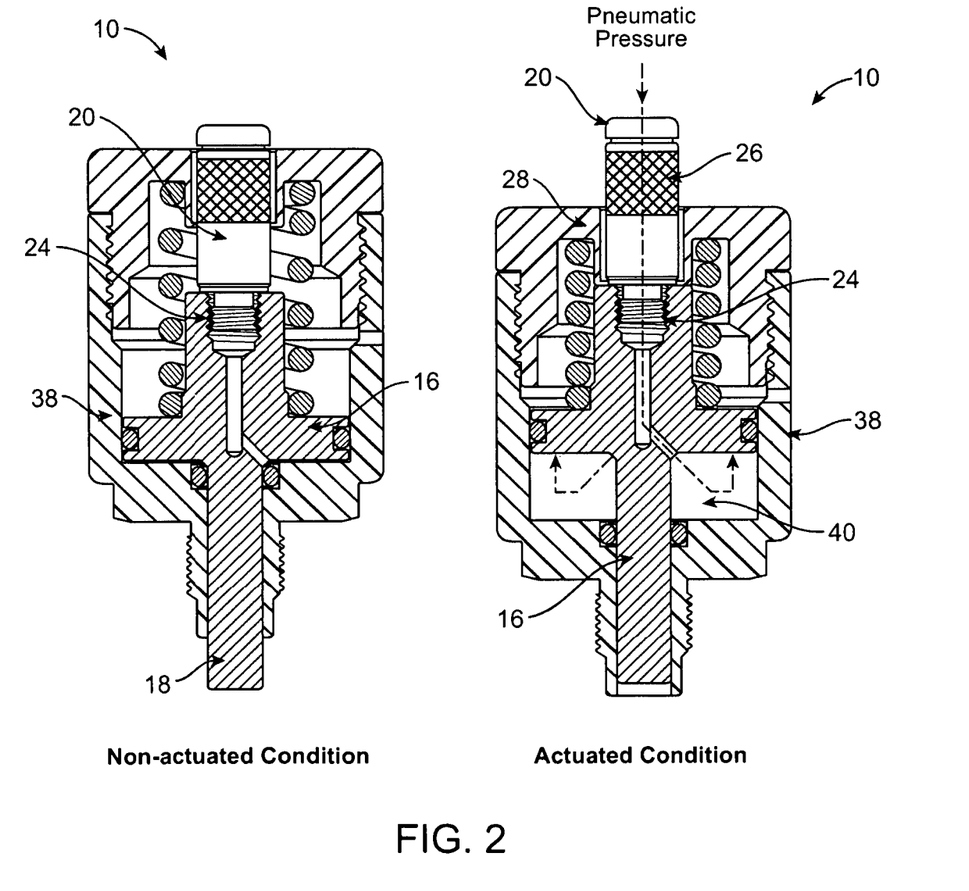
FIG. 2 illustrates cross-sectional view of an exemplary embodiment of a normally-closed pneumatic valve actuator having integral status indication in both a non-actuated condition and an actuated condition.

FIG. 2 depicts a cross-sectional view of a normally-closed pneumatic valve actuator 10. The pneumatic valve actuator 10 has an actuator housing 10 having a recessed bore 28 therein for receiving a visual indicator 20. The visual indicator 20 is configured for longitudinal reciprocation within the bore 28. The actuator housing 10 also has a cylinder 38, in which an actuating pressure chamber 40 is formed. A piston 16 is received within the cylinder 38 and reciprocates within the actuating pressure chamber 40. The movement of the piston 16 is actuated by a fluid pressure supply because the actuating pressure chamber 40 is in fluid communication with fluid pressure supply. The visual indicator 20 is coupled to the piston 16 via a threaded connection 24 and reciprocates within the recessed bore 28 of the actuator housing 10 as the piston 16 reciprocates within the cylinder 38. This reciprocation is in response to fluid pressure build-up in the actuating pressure chamber 40 from the fluid pressure supply. Although the figures depict the piston 16 and visual indicator 20 coupled by a threaded connection 24, the visual indicator 20 can be coupled by other attachments.

Figure 3:
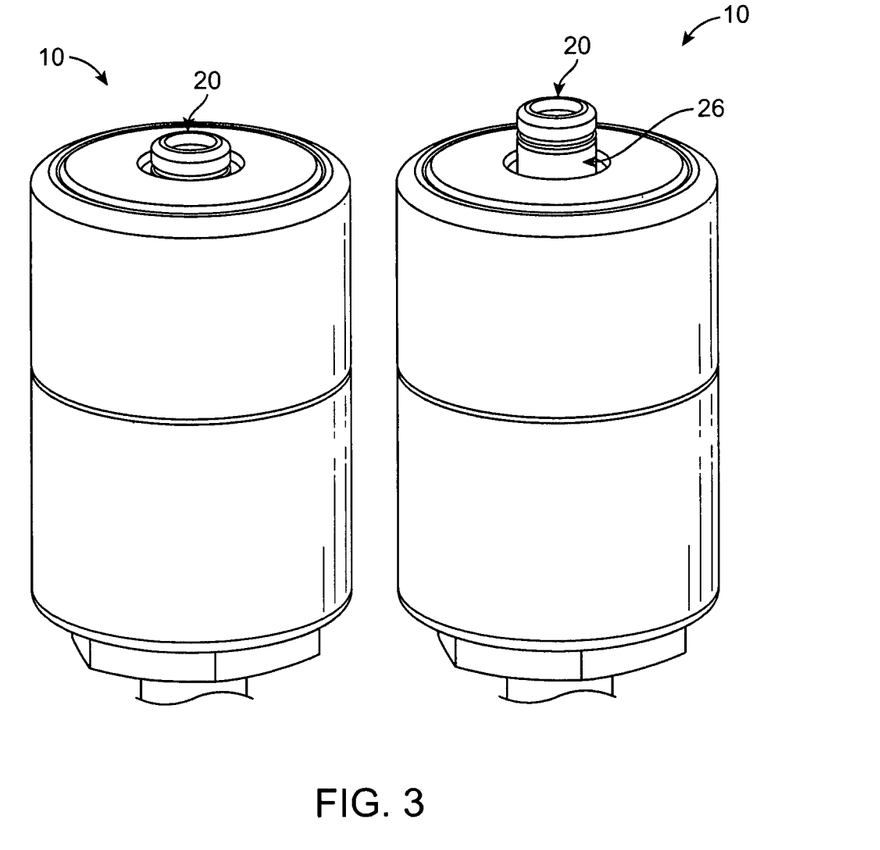
FIG. 3 illustrates a perspective view of an exemplary pneumatic valve actuator having integral status indication in both a non-actuated and an actuated condition.

FIG. 3 shows a perspective view of the pneumatic valve actuator 10 in both an actuated and a non-actuated condition, as it would be seen by someone monitoring the status of the associated valve. As illustrated on the left, the actuator 10 is controlling the valve in a closed state. Once pneumatic pressure is supplied, the actuator 10 is controlled to an open state, whereby the visual indicator 20 moves and exposes the indicator band 26.

Now referring to FIGS. 1, 2, 3, and 6, the visual indicator 20 has an indicator band 26 that further helps a person monitoring the valve distinguish between an open and closed valve. The indicator band 26 can be a portion of the visual indicator 20 that extends outside the bore 28 when the visual indicator 20 is an extended configuration and can be colored different from the remainder of the visual indicator 20. In alternative embodiments, the indicator band 26 can be a label attached to the visual indicator 20 or can be painted on the visual indicator 20. The indicator band 26 can also be a visually distinctive color from the rest of the visual indicator 20 such as green, red, or the like to help make the indicator band 26 more visually apparent. Also, the indicator band 26 can be at least twenty-five percent of the length of the visual indicator 20. In some pneumatic actuators 10, the indicator band 26 can be at least ten millimeters to ensure a person monitoring the actuator 10 can easily determine the status of the valve.

Figure 7:
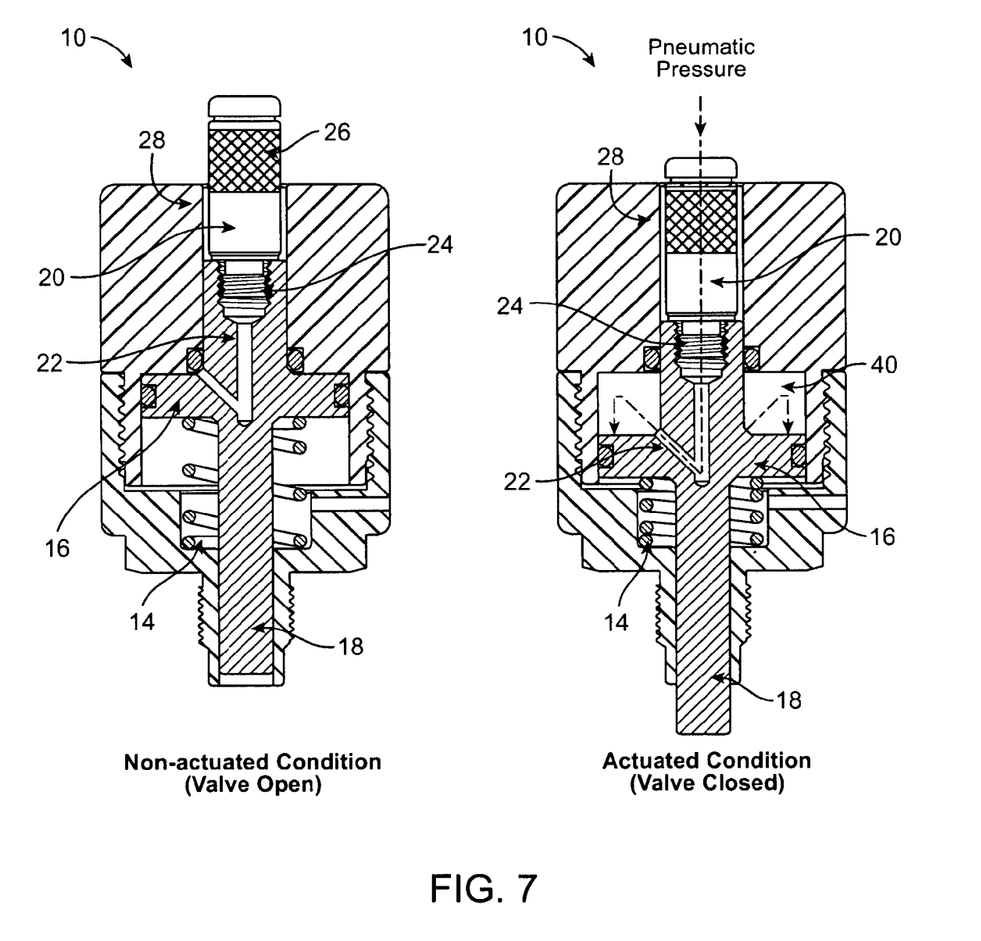
FIG. 7 is a cross-sectional view of an exemplary embodiment of a normally-open pneumatic valve actuator having integral status indication in both a non-actuated condition and an actuated condition.

FIG. 7 illustrates an alternative embodiment of a normally-open pneumatic valve actuator 10. In a normally-open pneumatic valve actuator 10, pneumatic pressure is applied to the actuator 10 to close the valve. Whereas in a normally-closed pneumatic valve actuator 10 (depicted in FIGS. 1 and 2), pneumatic pressure is applied to the actuator 10 to open the valve. In the non-actuated condition of normally-open pneumatic valve actuator 10, the load spring 14 pushes the visual indicator 20 into an extended configuration outside the bore 28 of the actuator 10 such that the indicator band 26 is visually apparent. This extended configuration informs a person monitoring the valve that the valve is open and no pressure is inside the actuating pressure chamber 40. In this non-actuated condition, the piston stem 18 is retracted and does not exert pressure on a valve button or diaphragm to open the valve. So, when the visual indicator 20 is in an extended configuration, a person monitoring the valve has a reliable indication that the valve is open and that there is no pressure inside the actuating pressure chamber 40.

However, in the actuated condition of a normally open pneumatic actuator, when pneumatic pressure is applied to the actuator 10, fluid is supplied through the visual indicator 20 which is coupled to the piston 16. FIG. 7 shows the visual indicator 20 coupled to the piston 16 by a threaded connection 24, but it can be coupled by other attachments. The movement of the piston 16 is actuated by the fluid pressure supply because the actuating pressure chamber 40 is in fluid communication with fluid pressure supply. The fluid supplied to the visual indicator 20 is diverted through ports 22. As fluid flows through the ports 22 into the actuating chamber 40, a pressure is applied above the piston 16 causing the piston 16 to move downward. This then compresses the load spring 14 which can transfer force on to a valve by way of a piston stem 18 which closes the valve. Also, as the piston 16 moves downward, the visual indicator 20 moves into a retracted configuration inside the bore 28 of the actuator 10 and an indicator band 26 on the visual indicator 20 is no longer exposed indicating a non-actuated condition, which in this case is a "valve closed" status. Because the visual indicator 20 is directly and mechanically linked to the piston 16, the visual indicator 20 provides a more reliable and true indication of the position of the valve as it will only expose the indicator band 26 in a non-actuated state.

Figure 8:
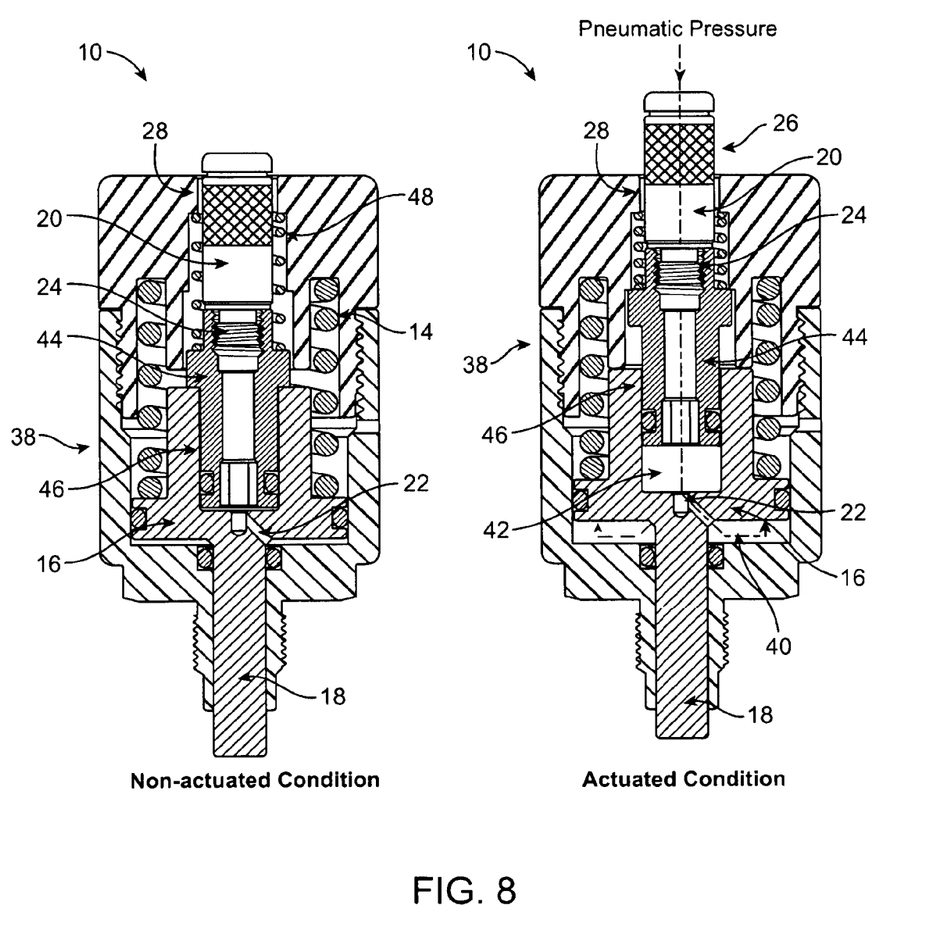
FIG. 8 is a cross-sectional view of an alternative exemplary embodiment of a normally-closed pneumatic valve actuator having integral status indication, in both a non-actuated condition and an actuated condition, configured for amplified actuation strokes.

FIG. 8 shows yet another exemplary embodiment of a pneumatic actuator 10 having integral status indication. Here, the pneumatic actuator 10 is a normally-closed pneumatic actuator 10 having two pistons 16 and 44 to allow short valve actuation strokes while still maintaining sufficient visual indicator 20 strokes to enable the indicator band 26 to be seen.

In this embodiment, the actuator housing 10 has a recessed bore 28 and a visual indicator 20 received therein for longitudinal reciprocation and two cylinders 38 and 46. A first actuating pressure chamber 40 is formed as part of the first cylinder 38. A first piston 16 also reciprocates longitudinally inside the first cylinder 38. A second cylinder 46 is formed within the first piston 16, and a second piston 44 reciprocates longitudinally therein. Also, a second actuating pressure chamber 42 is formed within the second cylinder 46. The second actuating pressure chamber 42 is in fluid communication with the first actuating pressure chamber 40 by ports 22. The visual indicator 20 is coupled to the second piston 44 via a thread connection 24 but can be coupled by other attachments. The visual indicator 20 can also have an indicator band 26 on a portion of the visual indicator 20. This indicator band 26 makes the status of the valve position and the presence of pressure in the actuating pressure chamber 42 and 40 visually apparent to a person monitoring the pneumatic actuator 10.

As shown in FIG. 8, the visual indicator 20 reciprocates within the recessed bore 28 of the actuator 10 in response to fluid pressure build-up in the first and second actuating pressure chambers 40 and 42. In the non-actuated condition of a normally-closed pneumatic actuator 10 depicted in FIG. 8, the visual indicator 20 is kept in a retracted configuration by load springs 14 and 48. The first load spring 14 presses against the first piston 16 lowering the piston stem 18. The piston stem 18 can then press against a diaphragm of a valve to close the valve. As the first load spring 18 presses down on the first piston 16, the second piston 44 is also lowered by the second load spring 48. When the second piston 44 moves downward, the visual indicator 20 also moves into a retracted configuration. In this retracted configuration, the indicator band 26 is no longer exposed outside the bore 28 of the actuator 10. The retracted configuration thus indicates that the valve is closed and that there is no actuating pressure present in the first and second actuating pressure chambers 40 and 42.

In the actuated condition, actuating pressure is applied to the actuator 10 by supplying fluid through the visual indicator 20. As fluid flows through the visual indicator 20, a pressure is applied beneath the second piston 44, compressing the second load spring 48 and raising the second piston 44. This also moves the visual indicator 20 into an extended configuration. In this extended configuration, the indicator band 26 is exposed outside the bore. As fluid builds inside the second actuating pressure chamber 42, fluid is diverted into the first actuating pressure chamber 40 by way of ports 22. This fluid in the first actuating pressure chamber 40 then applies a pressure beneath the first piston 16 which raises the first piston 16 and piston stem 18 to open a valve. So, when pressure is present in the first and second actuating pressure chambers 40 and 42, the visual indicator 20 is in an extended configuration exposing an indicator band 26 to indicate the valve is open. Because the visual indicator 20 is directly and mechanically linked to the first and second pistons 16 and 44, the visual indicator 20 provides a more reliable and true indication of the position of the valve as it will only expose the indicator band 26 in an actuated state.

With such a two-piston configuration, the spring stiffness of the load springs 14 and 48 can be varied. For example, the first load spring 14 can have a higher spring stiffness than the second load spring 48. This results in shorter strokes of the first piston 16, but larger strokes of the visual indicator 20. Because the first load spring 14 has a higher stiffness than the second load spring 48, the first piston 16 does not reciprocate within the first cylinder 38 as much as the second piston 44 does within the second cylinder 46. The second piston 44 and thus the visual indicator 20 coupled to the second piston 44 have an amplified stroke compared to the first piston 13. The second load spring 48 has a lower stiffness and allows the spring 48 to compress more and allows the visual indicator 20 extend further outside the bore 28 of the actuator 10, even if the stroke of the first piston 16 is relatively small. This two-piston configuration and varied spring stiffness can allow the second piston 44 to move a greater distance than the first piston 16. For example, the load springs 14 and 48 can be chosen such that their stiffnesses will move the second piston 44 twice the distance the first piston 16 moves. With this amplified stroke, a person monitoring the actuator 10 and valve will still be able to determine if there is pressure inside the first and second actuating pressure chambers 40 and 42 and whether the valve is open or closed even though the first piston 16 barely reciprocates within the first cylinder 38. Although, FIG. 8 shows the two-piston configuration in a normally-closed pneumatic actuator, it can also be implemented in a normally-open pneumatic actuator.

Exemplary embodiments have been described hereinabove regarding a pneumatic actuator 10 having integral status indication. Various modifications to and departures from the disclosed embodiments will occur to those having skill in the art. The subject matter that is intended to be within the spirit of this disclosure is set forth in the following claims.

What is claimed is:

1. A pneumatic valve actuator having a built-in, pop-out visual indicator of an actuated versus unactuated condition of the actuator, said actuator comprising:

an actuator housing having a recessed bore therein and the visual indicator reciprocatingly received in said recessed bore and configured for longitudinal reciprocation therein;

an actuating pressure chamber formed as part of a cylinder within the pneumatic valve actuator and in which a piston reciprocates, said actuating pressure chamber being in fluid communication with an external fluid pressure supply and said visual indicator coupled to said piston so that said visual indicator reciprocates within the recessed bore when said piston reciprocates within the cylinder responsively to fluid pressure build-up in said actuating pressure chamber from the external fluid pressure supply;

an outermost exposed end of the visual indicator forming a fluid coupling passage, which connects the visual indicator to the external fluid pressure supply;

an innermost end of the visual indicator opposite the outermost end having external thread formed thereon and configured to threadingly couple the visual indicator via a corresponding inner thread formed within the piston;

said visual indicator having a passage formed therein, wherein the passage is in fluid communication with the actuating pressure chamber and the fluid coupling passage, so that fluid can be supplied from the external fluid pressure supply through the fluid coupling passage of the visual indicator to the passage of the visual indicator and then to the actuating pressure chamber; and said visual indicator being in a retracted configuration and predominantly within said recessed bore when actuating pressure is not present in said actuating pressure chamber and said visual indicator being in an extended configuration predominantly outside said recessed bore when actuating pressure is present in said actuating pressure chamber.

2. The pneumatic valve actuator as recited in claim 1, wherein a portion of said visual indicator that extends outside of said recessed bore in said extended configuration is colored different from a remainder of said visual indicator.

3. The pneumatic valve actuator as recited in claim 2, wherein said portion is colored green.

4. The pneumatic valve actuator as recited in claim 2, wherein said portion is at least twenty-five percent of the length of the visual indicator.

5. The pneumatic valve actuator as recited in claim 2, wherein said portion is at least ten millimeters.

6. A pneumatic valve actuator having a built-in, pop-out visual indicator of an actuated versus unactuated condition of the actuator, said actuator comprising:

an actuator housing having a recessed bore therein and the visual indicator reciprocatingly received in said bore and configured for longitudinal reciprocation therein;

an actuating pressure chamber formed as part of a cylinder within the pneumatic valve actuator and in which a piston reciprocates, said actuating pressure chamber being in fluid communication with an external fluid pressure supply and said visual indicator coupled to said piston so that said visual indicator reciprocates within the recessed bore when said piston reciprocates within the cylinder responsively to fluid pressure build-up in said actuating pressure chamber from the external fluid pressure supply;

said visual indicator being in a retracted configuration and predominantly within said bore when actuating pressure is present in said actuating pressure chamber and said visual indictor being in an extended configuration predominantly outside said bore when actuating pressure is not present in said actuating pressure chamber;

an outermost exposed end of the visual indicator forming a fluid coupling passage, which connects the visual indicator to the external fluid pressure supply; and said visual indicator having a passage formed therein, wherein the passage is in fluid communication with the actuating pressure chamber and the fluid coupling passage, so that fluid can be supplied from the external fluid pressure supply through the fluid coupling passage of the visual indicator to the passage of the visual indicator and then to the actuating pressure chamber.

7. The pneumatic valve actuator as recited in claim 6, wherein a portion of said visual indicator that extends outside of said bore in said extended configuration is colored different from a remainder of said visual indicator.

8. The pneumatic valve actuator as recited in claim 7, wherein said portion is colored green.

9. The pneumatic valve actuator as recited in claim 7, wherein said portion is at least twenty-five percent of the length of the visual indicator.

10. The pneumatic valve actuator as recited in claim 7, wherein said portion is at least ten millimeters.

11. A pneumatic valve actuator having a built-in, pop-out visual indicator of an actuated versus unactuated condition of the actuator, said actuator comprising:

an actuator housing having a recessed bore therein and the visual indicator reciprocatingly received in said bore and configured for longitudinal reciprocation therein;

a first actuating pressure chamber formed as part of a first cylinder within the pneumatic valve actuator and in which a first piston reciprocates and a second actuating pressure chamber formed within said first piston and in which a second piston reciprocates, each of said actuating pressure chambers being in fluid communication with an external fluid pressure supply and said visual indicator coupled to said second piston so that said visual indicator reciprocates within the recessed bore when said first and second pistons reciprocate within the respective cylinders responsively to fluid pressure build-up in said actuating pressure chambers from the external fluid pressure supply;

said visual indicator being in a retracted configuration and predominantly within said bore when actuating pressure is not present in said actuating pressure chambers and said visual indictor being in an extended configuration predominantly outside said bore when actuating pressure is present in said actuating pressure chambers;

an outermost exposed end of the visual indicator forming a fluid coupling passage, which connects the visual indicator to the external fluid pressure supply; and said visual indicator having a passage formed therein, wherein the passage is in fluid communication with the actuating pressure chamber and the fluid coupling passage, so that fluid can be supplied from the external fluid pressure supply through the fluid coupling passage of the visual indicator to the passage of the visual indicator and then to the actuating pressure chamber.

12. The pneumatic valve actuator as recited in claim 11, wherein a portion of said visual indicator that extends outside of said bore in said extended configuration is colored different from a remainder of said visual indicator.

13. The pneumatic valve actuator as recited in claim 12, wherein said portion is colored green.

14. The pneumatic valve actuator as recited in claim 12, wherein said portion is at least twenty-five percent of the length of the visual indicator.

15. The pneumatic valve actuator as recited in claim 12, wherein said portion is at least ten millimeters.

16. The pneumatic valve actuator as recited in claim 11, wherein said second piston moves a second distance that is greater than a first distance that the first piston moves.

17. The pneumatic valve actuator as recited in claim 16, wherein the second distance is about twice the first distance.

* * * * *